US011824407B2

(12) United States Patent
Lee et al.

(10) Patent No.: US 11,824,407 B2
(45) Date of Patent: Nov. 21, 2023

(54) DISTRIBUTED STRAIGHT-ANGLE ARMATURE WINDING, MOTOR COMPRISING SAME, AND METHOD FOR MANUFACTURING SAME

(71) Applicant: KOREA INSTITUTE OF INDUSTRIAL TECHNOLOGY, Cheonan-si (KR)

(72) Inventors: Eui Chun Lee, Gumi-si (KR); Soon O Kwon, Daegu (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 906 days.

(21) Appl. No.: 16/651,350

(22) PCT Filed: Sep. 28, 2018

(86) PCT No.: PCT/KR2018/011515
§ 371 (c)(1),
(2) Date: Jul. 12, 2020

(87) PCT Pub. No.: WO2019/066542
PCT Pub. Date: Apr. 4, 2019

(65) Prior Publication Data
US 2020/0358343 A1 Nov. 12, 2020

(30) Foreign Application Priority Data

Sep. 29, 2017 (KR) .......................... 10-2017-0127413

(51) Int. Cl.
*H02K 15/04* (2006.01)
*H02K 3/12* (2006.01)
(Continued)

(52) U.S. Cl.
CPC ............... *H02K 15/04* (2013.01); *H02K 3/12* (2013.01); *H02K 3/28* (2013.01); *H02K 3/48* (2013.01); *H02K 15/06* (2013.01)

(58) Field of Classification Search
CPC ............... H02K 3/04–14; H02K 15/04; H02K 15/0414–0421
(Continued)

(56) References Cited

U.S. PATENT DOCUMENTS

2004/0207283 A1* 10/2004 Oohashi ............. H02K 15/0485
310/207
2015/0102699 A1* 4/2015 Mathoy ................. H02K 1/165
310/213
2016/0261159 A1* 9/2016 Tsuiki ................ H02K 15/0435

FOREIGN PATENT DOCUMENTS

KR 100444939 B1 8/2004
KR 1020100068871 A 6/2010
(Continued)

OTHER PUBLICATIONS

Machine translation of WO-2016084442-A1 (Year: 2016).*
International Search Report dated Mar. 13, 2019 for PCT/KR2018/011515.

*Primary Examiner* — Quyen P Leung
*Assistant Examiner* — Minki Chang
(74) *Attorney, Agent, or Firm* — CANTOR COLBURN LLP

(57) ABSTRACT

A method for manufacturing a distributed straight-angle armature winding according to the present invention comprises a step (a) of preparing a raw material in which at least a pair of intra-slot winding areas and an end winding area provided between the pair of intra-slot winding areas are continued, a step (b) of forming an inclined surface by processing a contact surface in contact with an inner surface of a slot of at least a stator of the circumferences of the pair
(Continued)

of intra-slot winding areas, and a step (c) of bending a space between the end winding area and the intra-slot winding area.

8 Claims, 21 Drawing Sheets

(51) Int. Cl.
*H02K 3/28* (2006.01)
*H02K 3/48* (2006.01)
*H02K 15/06* (2006.01)

(58) Field of Classification Search
USPC .................................................. 310/202–207
See application file for complete search history.

(56) References Cited

FOREIGN PATENT DOCUMENTS

| | | | |
|---|---|---|---|
| KR | 101224688 B1 | 1/2013 | |
| KR | 1020140115265 A | 9/2014 | |
| KR | 1020150033665 A | 4/2015 | |
| WO | WO-2016084442 A1 * | 6/2016 | ............. H01F 41/06 |

\* cited by examiner

DISTRIBUTED STRAIGHT-ANGLE ARMATURE WINDING, MOTOR COMPRISING SAME, AND METHOD FOR MANUFACTURING SAME

TECHNICAL FIELD

The present invention relates to a distributed straight-angle armature winding, a motor comprising the same, and a method for manufacturing the same, and more particularly, to a distributed straight-angle armature winding, a motor comprising the same, and a method for manufacturing the same capable of maximizing a space factor of a distributed motor.

BACKGROUND ART

Generally, a distributed type motor refers to a motor having a winding method of dividing and winding one phase of coil into two or more slots in a stator formed with slots.

Recently, various automobile manufacturers have produced motors for various types of vehicles by applying a distributed winding technology.

However, a conventional motor has a problem that there is a limitation that efficiency and output density cannot be increased by a certain level or more due to a low space factor.

Therefore, there is a need for a method for solving such problems.

DISCLOSURE

Technical Problem

The present invention is derived to solve the problems in the related art and an object of the present invention is to secure higher efficiency and output density by securing a better space factor than a commercialized distributed winding technology.

Another object of the present invention is to manufacture a winding for maximizing a space factor rapidly with low price.

The objects of the present invention are not limited to the aforementioned objects, and other objects, which are not mentioned above, will be apparently understood to those skilled in the art from the following description.

Technical Solution

A method for manufacturing a distributed straight-angle armature winding of the present invention to achieve the objects comprises a step (a) of preparing a raw material in which at least a pair of intra-slot winding areas and an end winding area provided between the pair of intra-slot winding areas are continuous, a step (b) of forming an inclined surface by processing a contact surface in contact with an inner surface of a slot of at least a stator of the circumferences of the pair of intra-slot winding areas, and a step (c) of bending a space between the end winding area and the intra-slot winding area.

In the step (b), a surface outside the contact surface of the circumferences of the pair of intra-slot winding areas may be further processed so that a height of the intra-slot winding area is lower than a height of the end winding area.

In the step (b), the circumference of the intra-slot winding area may be processed using a rolling roller.

In the step (b), the intra-slot winding area may be pressed using a first press tool having a first press groove of which a lower portion is opened.

A plurality of first press tools may be provided to have different standards to correspond to the intra-slot winding areas and the end winding area.

In the step (b), the intra-slot winding areas and the end winding area may be simultaneously pressed using a second press tool in which the first press tools having different standards are integrally formed.

In the step (c), the raw material may be positioned on a circumference of a bending base jig and the end winding area and the space between the end winding area and the intra-slot winding area may be bent by moving the bending roller along the circumference of the bending base jig.

In the step (c), the bending may be performed while the raw material is pressed using a bending cover jig of pressing the raw material from the top of the bending base jig.

A distributed straight-angle armature winding of the present invention to achieve the object comprises at least a pair of intra-slot winding areas in which a contact surface in contact with an inner surface of a slot of a stator is inclined, and an end winding area provided to connect the pair of intra-slot winding areas to each other.

A height of the intra-slot winding area may be formed to be lower than a height of the end winding area.

The cross section of the intra-slot winding area may be formed in a trapezoidal shape and the cross section of the end winding area may be formed in a rectangular shape.

A plurality of end winding areas may be included.

The end winding area may have at least a central portion formed flatly.

The end winding area may be formed to be inclined so that the pair of intra-slot winding areas has different phases.

The pair of intra-slot winding areas may be formed to have different cross-sectional areas.

A method for manufacturing a motor of the present invention to achieve the object comprises a step (a) of preparing a raw material in which at least a pair of intra-slot winding areas and an end winding area provided between the pair of intra-slot winding areas are continuous, a step (b) of forming an inclined surface by processing a contact surface in contact with an inner surface of a slot of at least a stator of circumferences of the pair of intra-slot winding areas, a step (c) of manufacturing a distributed straight-angle armature winding by bending a space between the end winding area and the intra-slot winding area, a step (d) of inserting the intra-slot winding area of the distributed straight-angle armature winding into each selected slot of the stator in which a plurality of slots is formed in a circumference direction, and a step (e) of connecting intra-slot winding areas of different distributed straight-angle armature windings inserted into the plurality of slots to each other.

An insulating coating having a high elongation rate may be formed on the circumference of the raw material.

A motor of the present invention to achieve the object comprises a rotor, a stator in which a plurality of slots is formed in a circumference direction, and a distributed straight-angle armature winding comprising at least a pair of intra-slot winding areas in which a contact surface in contact with an inner surface of a slot of a stator is inclined, and an end winding area provided to connect the pair of intra-slot winding areas to each other, wherein the intra-slot winding areas are inserted into different slots of the stator to be connected with intra-slot winding areas of another distributed straight-angle armature winding.

Advantageous Effects

The distributed straight-angle armature winding of the present invention and the motor comprising the same to solve the objects have an advantage of securing excellent efficiency and output density by securing a maximized space factor as compared with a distributed winding technology commercialized currently.

In addition, the distributed straight-angle armature winding and the method for manufacturing the motor comprising the same according to the present invention have an advantage of manufacturing windings in large quantities by a rapid and efficient method and being advantageous for introducing automation.

In addition, since the windings may be manufactured in a variety of methods, there is an advantage in that it is possible to select and apply a suitable method specialized for manufacturing equipment.

The effects of the present invention are not limited to the aforementioned effects, and other effects, which are not mentioned above, will be apparently understood to those skilled in the art from the description of appended claims.

MODES OF THE INVENTION

Figure 1:
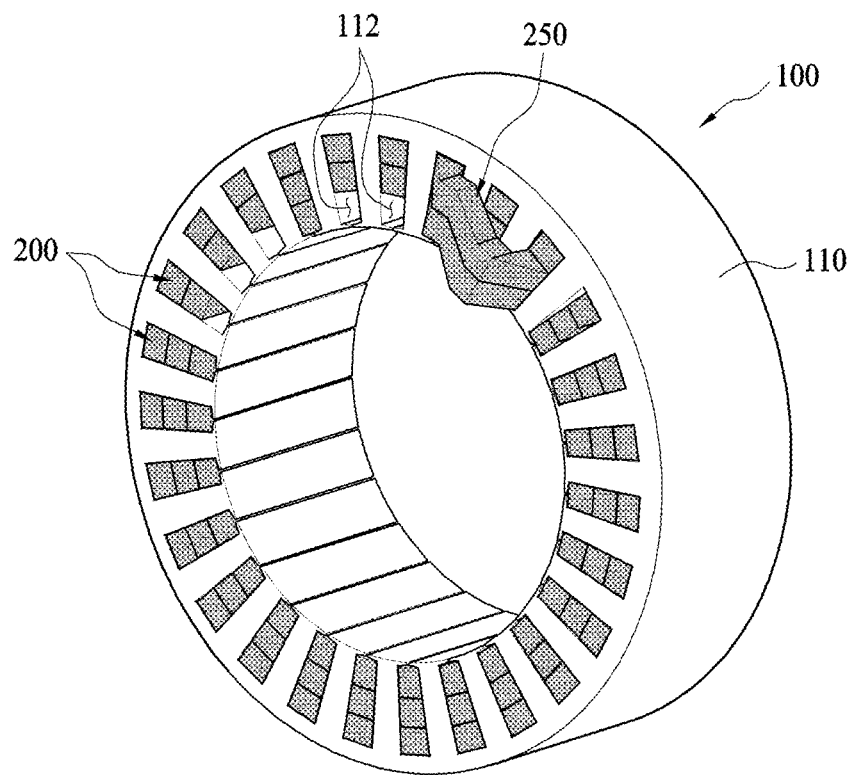
FIG. 1 is a diagram illustrating an appearance of a motor comprising a distributed straight-angle armature winding according to an embodiment of the present invention.

Hereinafter, a preferred embodiment of the present invention, of which object of the present invention may be realized in detail, will be described with reference to the accompanying drawings. In describing the embodiments, like names and like reference numerals are used with respect to like components and the resulting additional description will be omitted.

Figure 2:
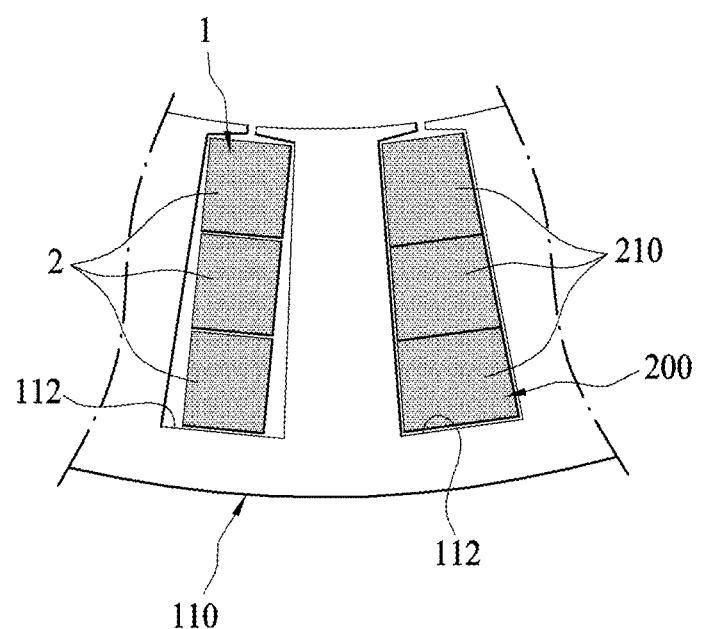
FIG. 2 is a diagram illustrating comparison of forms in which a conventional distributed winding and a distributed straight-angle armature winding according to an embodiment of the present invention are dropped in slots.

FIG. 1 is a diagram illustrating an appearance of a motor 100 comprising a distributed straight-angle armature winding 250 according to an embodiment of the present invention, and FIG. 2 is a diagram illustrating comparison of forms in which a conventional distributed winding 1 and a distributed straight-angle armature winding 250 according to an embodiment of the present invention are dropped in slots 112.

As illustrated in FIGS. 1 and 2, a motor 100 comprising a distributed straight-angle armature winding 200 according to an embodiment of the present invention includes a rotor (not illustrated), a stator 110 and a plurality of armature windings 200.

In the stator 110, a plurality of slots 112 are formed, and particularly, in the present embodiment, the stator 110 has a long hole-shaped slot 112 formed in a circumferential direction. At this time, since the stator 110 is formed in a circular cross-sectional shape as a whole, the slot 112 has a shape in which a width gradually increases from the center of the stator 110 toward an outer circumferential direction.

In addition, the armature winding 200 includes an intra-slot winding area 210 formed to be inserted into the slot 112 and an end winding area 250 provided outside the slot 112 and connected with the intra-slot winding area 210.

The armature winding 200 has a shape in which at least a pair of intra-slot winding areas 210 and the end winding area 250 provided between the pair of intra-slot winding areas 210 are continuous.

In this case, as illustrated in FIG. 2, the intra-slot winding areas 210 may be formed to have an inclined contact surface in contact with an inner surface of at least the slot 112 of the stator 110 of the entire circumference.

The reason for doing this is to maximize a space factor of the slot 112 in the form that the width gradually increases toward the outer circumferential direction from the center of the stator 110. In the case of the present invention, as shown in the right drawing of FIG. 2, it can be seen that the intra-slot winding areas 210 of the armature winding 200 fills the inside of the slot 112 so that no empty space remains in the slot 112. This is compared with an appearance in which a cross section of an intra-slot winding areas 2 of an armature winding 1 in the related art illustrated on the left side of FIG. 2 is formed in a rectangular shape to form an empty space in the slot 112.

In addition, the end winding area 250 is provided to connect the pair of intra-slot winding areas 210.

Figure 3:
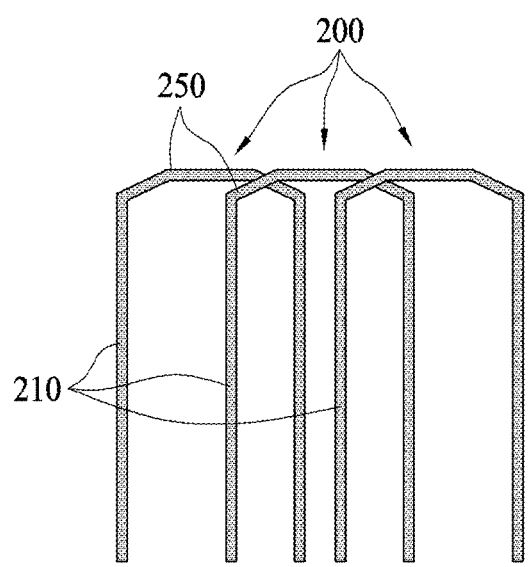
FIG. 3 is a diagram illustrating an appearance of a distributed straight-angle armature winding according to an embodiment of the present invention.

That is, as illustrated in FIG. 3, the distributed straight-angle armature winding 200 of the present invention has a basic configuration of the pair of intra-slot winding areas 210 and one end winding area 250 connecting the pair of intra-slot winding areas and may have a shape in which a space between the intra-slot winding areas 210 and the end winding area 250 is bent.

Figure 4:
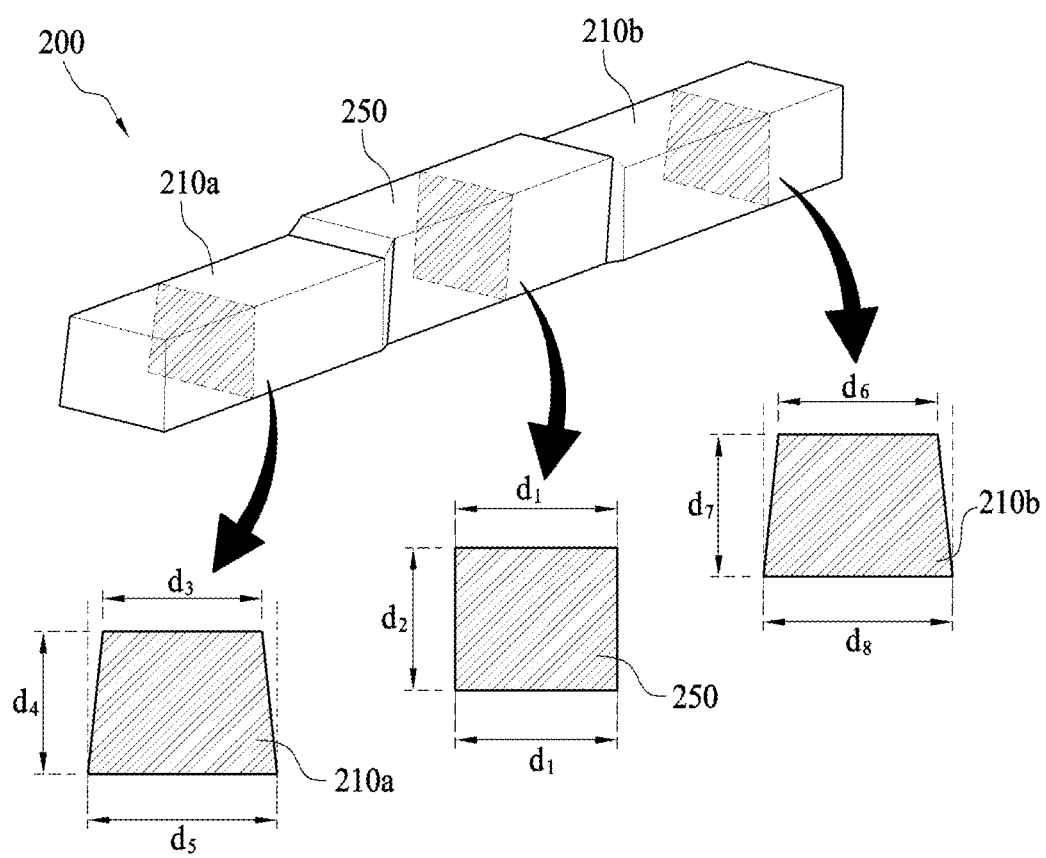
FIG. 4 is a diagram illustrating a cross-sectional shape for each area of a distributed straight-angle armature winding according to an embodiment of the present invention.

FIG. 4 is a diagram illustrating a cross-sectional shape for each area of the distributed straight-angle armature winding 200 according to an embodiment of the present invention.

As illustrated in FIG. 4, in the present embodiment, the end winding area 250 has a rectangular cross-section, and the shapes of the intra-slot winding areas 210a and 210b are trapezoidal.

Here, since the pair of intra-slot winding areas 210a and 210b connected to opposite sides based on the end winding area 250 have somewhat different standards from each other, the reference numerals are separated from each other. For convenience of description, these intra-slot winding areas are referred to as a first intra-slot winding area 210a and a second intra-slot winding area 210b, respectively.

Based on the direction illustrated in FIG. 4, in the present embodiment, lengths $d_1$ of the upper and lower surfaces of the end winding area 250 are greater than lengths $d_3$ and $d_6$ of the upper surfaces and lengths $d_5$ and $d_8$ of the lower surfaces of the first intra-slot winding area 210a and the second intra-slot winding area 210b. In addition, a height $d_2$ of the end winding area 250 is also greater than heights $d_4$ and $d_7$ of the first intra-slot winding area 210a and the second intra-slot winding area 210b.

Further, the length $d_6$ of the upper surface and the length $d_8$ of the lower surface of the second intra-slot winding area 210b are greater than the length $d_3$ of the upper surface and the length $d_5$ of the lower surface of the first intra-slot winding area 210a. The height $d_7$ of the second intra-slot winding area 210b is also greater than the height $d_4$ of the first intra-slot winding area 210a.

The reason is that the first intra-slot winding area 210a and the second intra-slot winding area 210b are inserted into different slots 112 of the stator 110 and inserted into different phases.

That is, as described above, since the slot 112 has a shape that gradually increases in width from the center of the stator 110 toward the outer circumferential direction thereof, the first intra-slot winding area 210a and the second intra-slot winding area 210b inserted into the different phases may also be formed to have different cross-sectional areas.

Unlike the present embodiment, when the first intra-slot winding area 210a and the second intra-slot winding area 210b are inserted into the same phase of the different slots 112, the cross-sectional areas of the first intra-slot winding area 210a and the second intra-slot winding area 210b may be formed to be the same.

In addition, in the present embodiment, the cross section of the end winding area 250 is formed in a rectangular shape, and the cross sections of the first intra-slot winding area 210a and the second intra-slot winding area 210b are formed in trapezoidal shapes. This is only one embodiment, and of course, the cross-sectional shapes of the end-winding area 250, the first intra-slot winding area 210a, and the second intra-slot winding area 210b may be formed in various shapes.

Hereinafter, a method of manufacturing such a distributed straight-angle armature winding 200 will be described.

Figure 5:
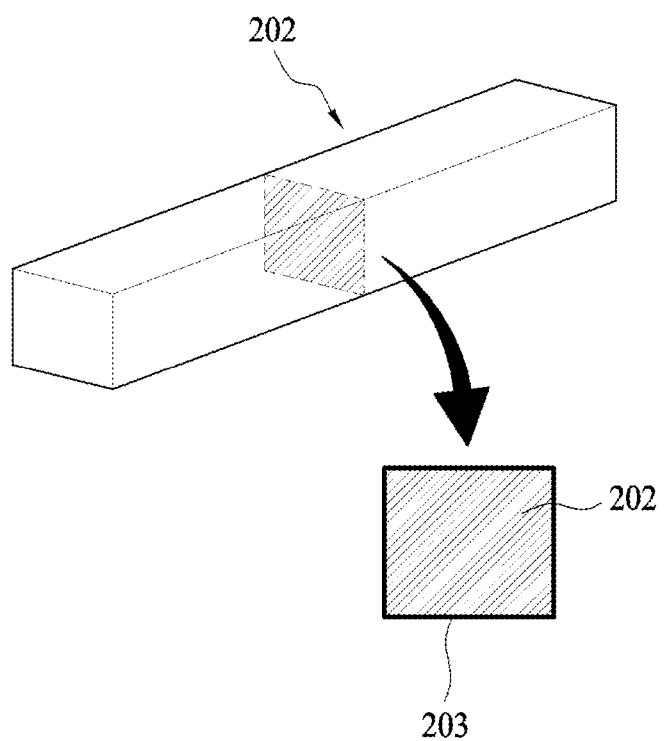
FIG. 5 is a view illustrating an appearance of a raw material which is applied to a method for manufacturing a motor comprising a distributed straight-angle armature winding according to an embodiment of the present invention.

The method of manufacturing the distributed straight-angle armature winding according to the present invention performs a step (a) of preparing a raw material 202 in which at least a pair of intra-slot winding areas and an end winding area provided between the pair of intra-slot winding areas are continuous as illustrated in FIG. 5. The raw material 202 illustrated in FIG. 5 may have the same cross-sectional area over the entire length because the intra-slot winding area and the end winding area are still processed.

In addition, in the present embodiment, it is assumed that an insulating coating 203 having a high elongation rate is formed on the circumference of the raw material 202.

Next, as illustrated in FIGS. 6 to 9, a step (b) of forming an inclined surface by processing a contact surface in contact with an inner surface of the slot of at least the stator of the circumferences of the pair of intra-slot winding areas 210a and 210b.

In this step, an area of the entire length of the raw material 202 corresponding to the intra-slot winding areas 210a and 210b may be processed in various methods.

Figure 6:
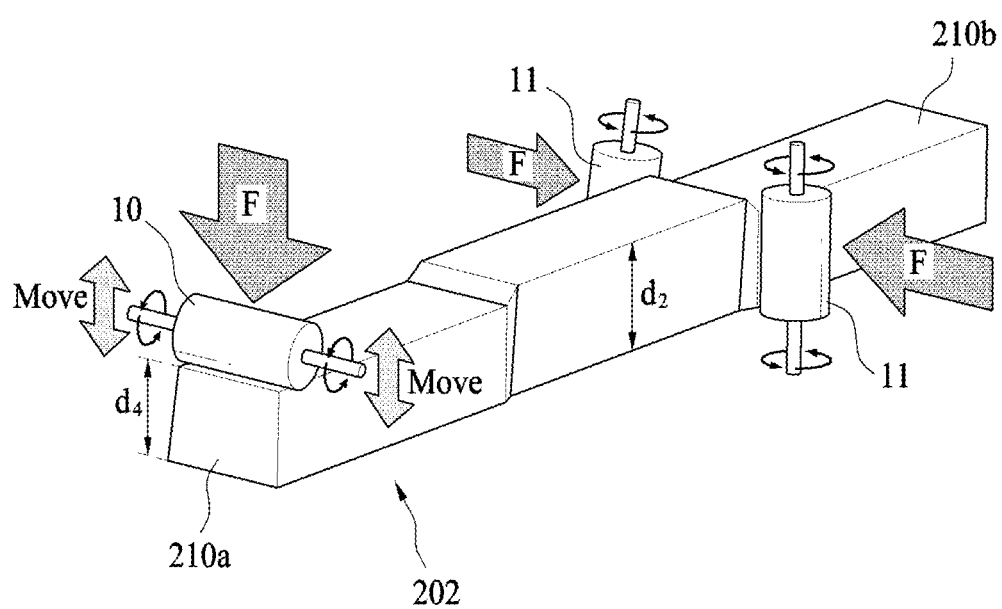
FIGS. 6 to 9 are diagrams illustrating a process of forming an intra-slot winding area and an end winding area by processing a circumference of a raw material in different methods in a method for manufacturing a motor comprising a distributed straight-angle armature winding according to an embodiment of the present invention.

For example, as illustrated in FIG. 6, in the step (b), the circumferences of the intra-slot winding areas 210a and 210b may be processed using rolling rollers 10 and 11. Specifically, the rolling rollers 10 and 11 may include a roller 11 for processing a contact surface in contact with the inner surface of the slot and a roller 10 for processing the upper surface. The rolling rollers 10 and 11 are plastically deformed by pressing and rotating the circumferences of the intra-slot winding areas 210a and 210b, respectively.

In particular, the roller 11 for processing the contact surface is formed to have an inclined rotational axis to process the contact surfaces of the intra-slot winding areas 210a and 210b to be inclined.

Figure 7:
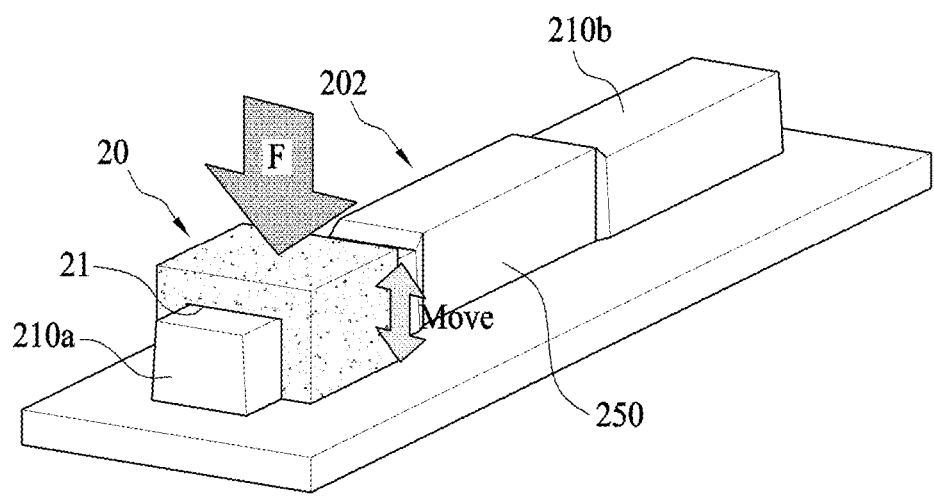

As another method, as illustrated in FIG. 7, in the step (b), a method of pressing the intra-slot winding areas 210a and 210b may be applied by using a first press tool 20 having a first press groove 21 of which at least a side surface is formed to be inclined and a lower portion is opened.

This is to plastically deform the intra-slot winding areas 210a and 210b to a shape corresponding to the first pressing groove 21 by pressing the first press tool 20 having the above shape from the top.

In this case, a plurality of first press tools 20 may be provided for each standard to form different cross-sectional shapes of the end winding area 250, the first intra-slot winding area 210a, and the second intra-slot winding area 210b.

Figure 8:
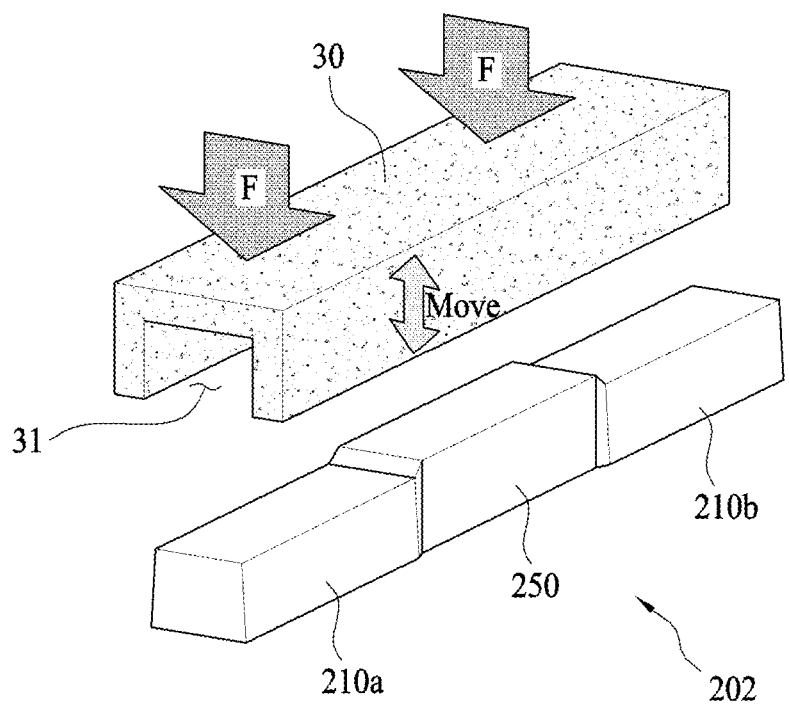

Also, as the same method, a processing method using a second press tool 30 may be applied as illustrated in FIG. 8.

The second press tool 30 has a second pressing groove 31 of which a lower portion is opened, like the first press tool 20 described above, but the second press tool 30 is different from the first press tool 20 in that the first press tools 20 having different standards for processing the intra-slot winding areas 210a and 210b and the end winding area 250 are integrally formed.

That is, the second pressing groove 31 is formed to be elongated in a longitudinal direction, and has a different shape for each area so as to correspond to the intra-slot winding areas 210a and 210b and the end winding area 250 along the longitudinal direction.

Such a method has an advantage of pressing the intra-slot winding areas 210a and 210b and the end winding area 250 at the same time.

Figure 9:
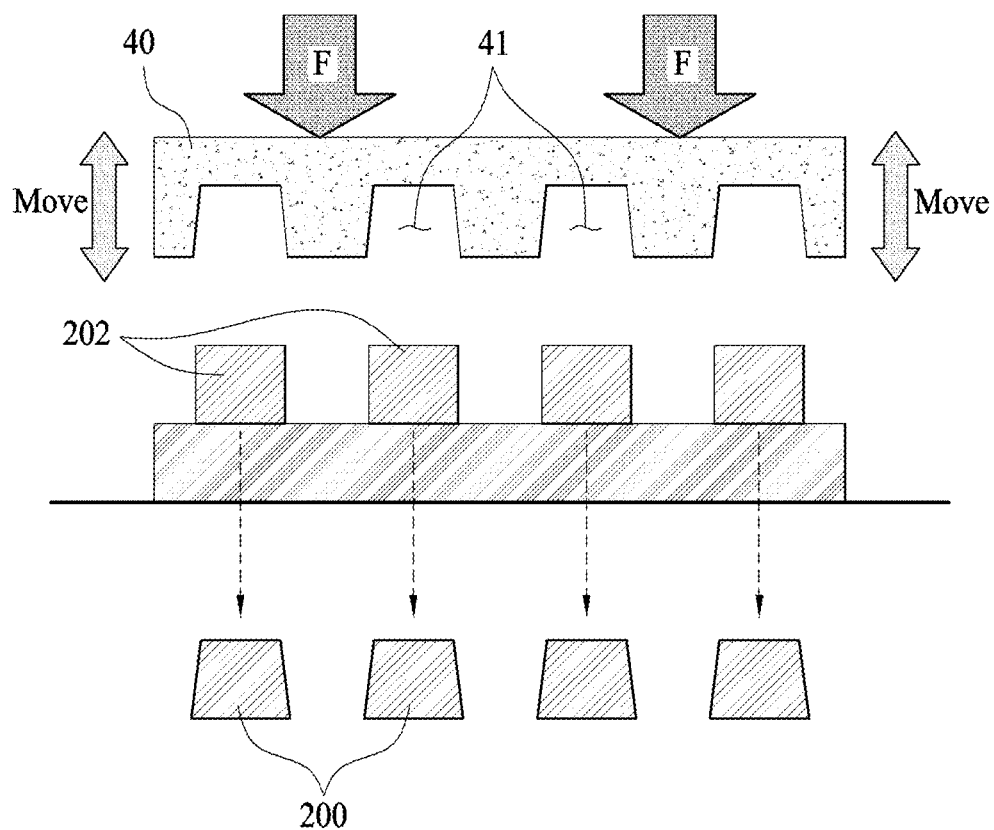

Alternatively, as illustrated in FIG. 9, a third press tool 40 in which a plurality of third pressing grooves 41 are formed may be applied for the step (b).

In the third press tool 40, a plurality of third pressing grooves 31 for processing the raw material 202 are arranged in parallel to manufacture a plurality of armature windings 200 simultaneously, thereby improving productivity.

After the step (b) as described above, a step (c) of bending between the end winding area 250 and the intra-slot winding areas 210a and 210b is performed.

This step is a step of bending and curving the intra-slot winding areas 210a and 210b from the end winding area 250 so that the armature winding 200 may then be inserted into the slot of the stator.

Figure 10:
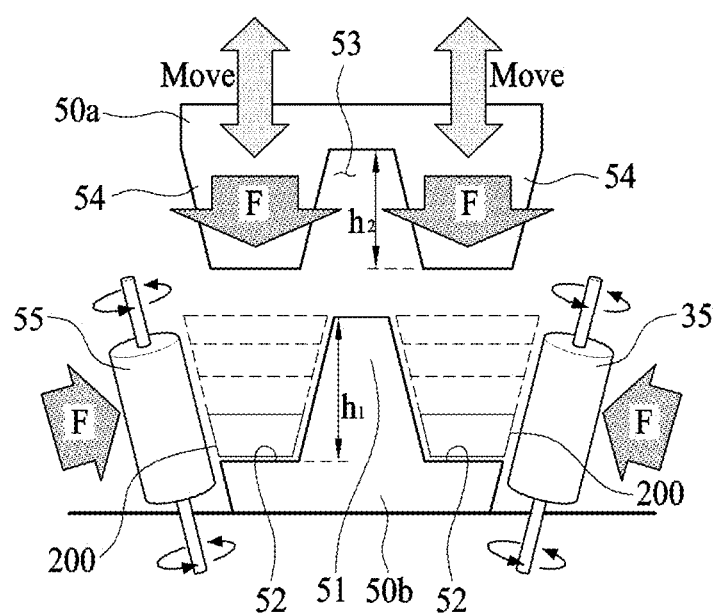
FIGS. 10 and 11 are diagrams illustrating a process of manufacturing a distributed straight-angle armature winding by bending a raw material in a method for manufacturing a motor comprising a distributed straight-angle armature winding according to an embodiment of the present invention.

The step (c) may also be performed by various methods that are not limited, and in the present embodiment, the step (c) uses a method of positioning the raw material in a bending base jig 50b, moving a bending roller 55 along the circumference of the bending base jig 50b, and bending the spaces between the end winding area 250 and the intra-slot winding areas 210a and 210b as illustrated in FIG. 10.

At this time, with the above process, the bending is performed while the raw material is pressed by using a bending cover jig 50a that pressurizes the raw material from the top of the bending base jig 50b.

Specifically, in the present embodiment, the bending base jig 50b includes a seating portion 52 formed to corresponding to the shape of the armature winding 200 subjected to the step (b) described above so that the pair of intra-slot winding areas 210a and 210b and the end winding area 250 are seated, and a support portion 51 protruding from the inside of the seating portion 52 toward the top.

In addition, the bending cover jig 50a includes a pressing portion 54 protruding to correspond to the shape of the seating portion 52 of the bending base jig 50b, and a recessed portion 53 recessed inside the pressing portion 54.

With such a shape, the bending base jig 50b and the bending cover jig 50a press the armature winding 200 mounted on the seating portion 52 while the seating portion 52 and the pressing portion 54, and the support portion 51 and the recessed portion 53 are engaged with each other.

In particular, in the present embodiment, a length $h_2$ of the pressing portion 54 may be formed to be shorter than a length $h_1$ of the supporting portion 51. This is because a space needs to be formed by the thickness of the armature winding 200 mounted on the seating portion 52 in a state where the bending base jig 50b and the bending cover jig 50a are engaged with each other.

Also, in the case of the present embodiment, the armature winding 200 including a pair of intra-slot winding areas 210a and 210b and one end winding area 250 is mounted and processed on the seating portion 52, but unlike this, the armature winding 200 having n intra-slot winding areas 210a and 210b and n−1 end winding areas 250 may also be processed (wherein, n is a natural number of 3 or more).

In this case, since the intra-slot winding areas 210a and 210b and the end winding areas 250 may be stacked on the seating portion 52, the length $h_2$ of the pressing portion 54 may be determined in consideration of a total height of the armature winding 200.

To this end, a plurality of bending cover jigs 50a may be separately provided with various standards having pressing portions 54 of various lengths, or may also be formed in a structure capable of separating/combining only the pressing portion 54. In the latter case, the pressing portion 54 may be prepared in various lengths and replaced according to a processing situation.

In addition, in the present embodiment, the pair of intra-slot winding areas 210a and 210b are illustrated as being positioned in the same phase, but as described above, the pair of intra-slot winding areas 210a and 210b may also be inserted into different slots of the stator, wherein the pair of intra-slot winding areas 210a and 210b is positioned at different heights from each other on the seating portion 52.

In this case, a prosthesis may be provided to provide a support surface between the intra-slot winding areas 210a and 210b provided at a higher position and the seating portion 52, and the length of the pressing portion 52 may also have a different phase for each area to correspond to the heights of the intra-slot winding areas 210a and 210b.

Figure 11:
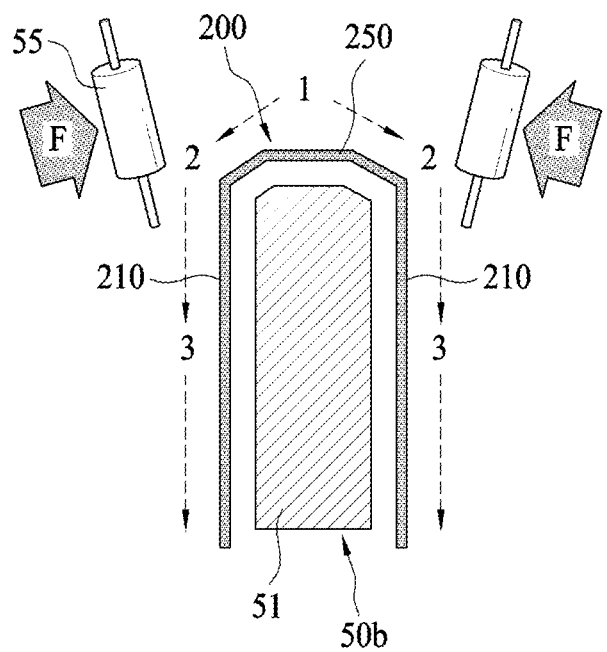

In the step (c), as illustrated in FIG. 11, the bending roller 55 moves along the circumferential shape of the support portion 51 through the above-described bending base jig 50b and the bending cover jig 50a, and the armature winding 200 is bent to be processed in a final shape.

Meanwhile, as described even in the process, the armature winding 200 may also have n intra-slot winding areas 210 and n−1 end winding areas 250 (wherein, n is a natural number of 3 or more).

Figure 12:
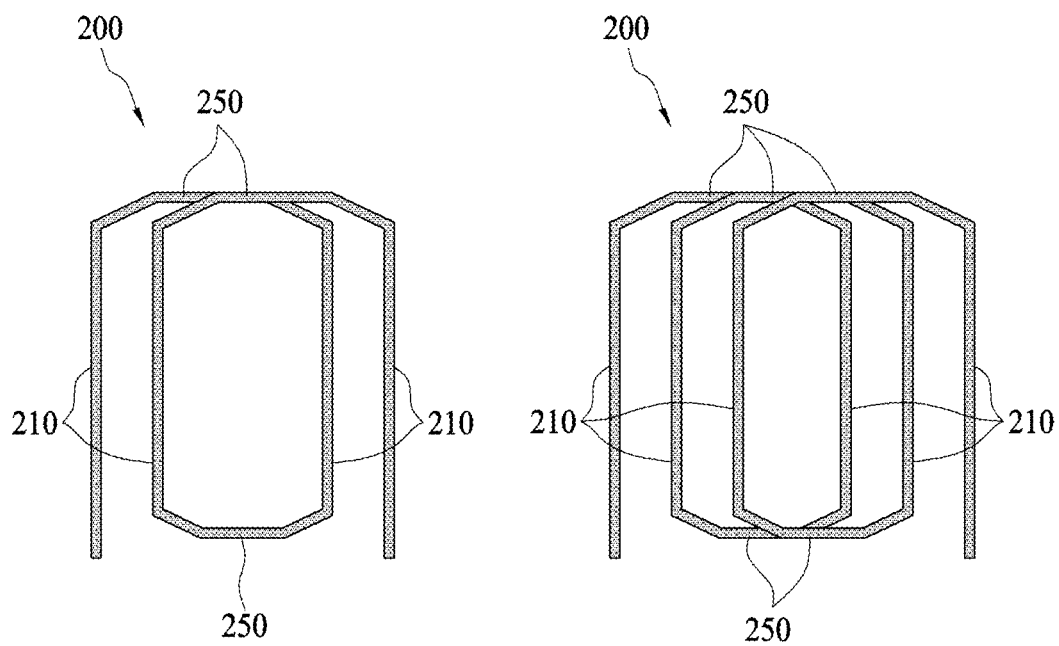
FIG. 12 is a diagram illustrating an appearance of a distributed straight-angle armature winding manufactured by a method for manufacturing a motor comprising a distributed straight-angle armature winding according to an embodiment of the present invention.

In this case, the final shape of the armature winding 200 may be processed in a shape illustrated in FIG. 12.

The armature winding 200 illustrated at the left side of FIG. 12 includes a total of four intra-slot winding areas 210 and three end winding areas 250 which are wound in the form of 2 turns, and the armature winding 200 illustrated at the right side of FIG. 12 includes a total of six intra-slot winding areas 210 and five end winding areas 250 which are wound in the form of 3 turns.

As such, in the present invention, it is possible to manufacture the armature winding 200 including the intra-slot winding areas 210 and the end winding areas 250 which are continuously connected to each other by varying the length of the raw material, wherein a process of welding the intra-slot winding areas 210 and the end winding areas 250 to each other may be entirely omitted.

Figure 13:
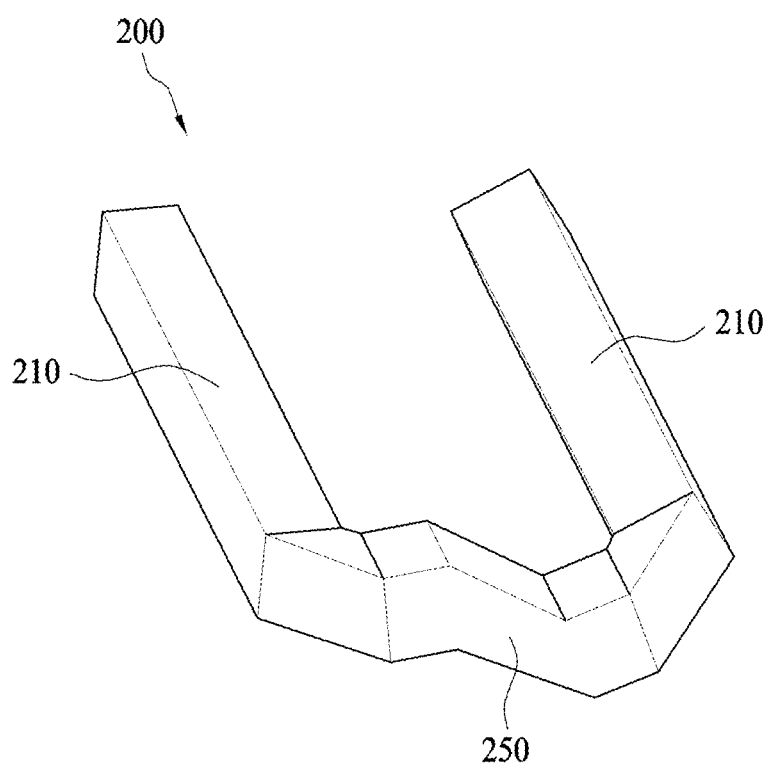
FIGS. 13 to 15 are diagrams illustrating various shapes of a distributed straight-angle armature winding according to an embodiment of the present invention.
Figure 14:
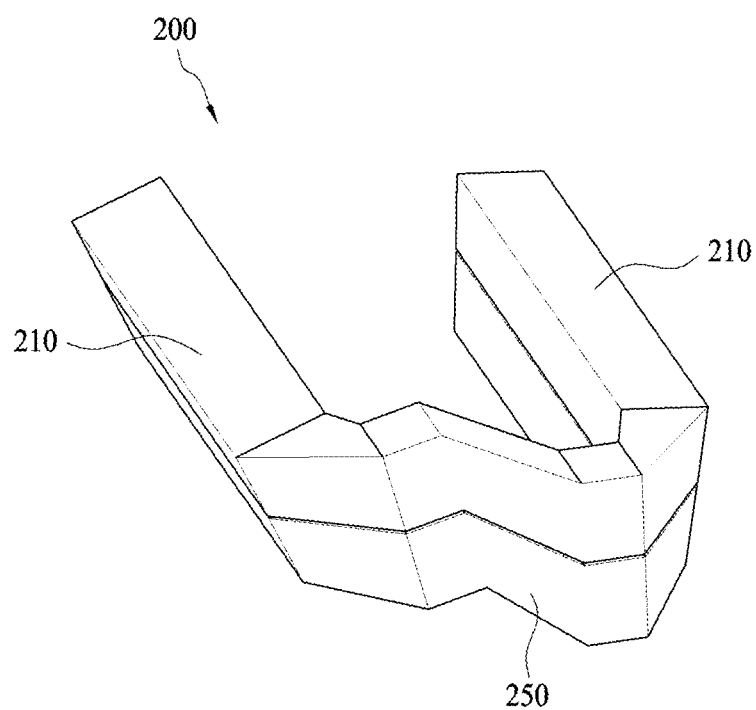
Figure 15:
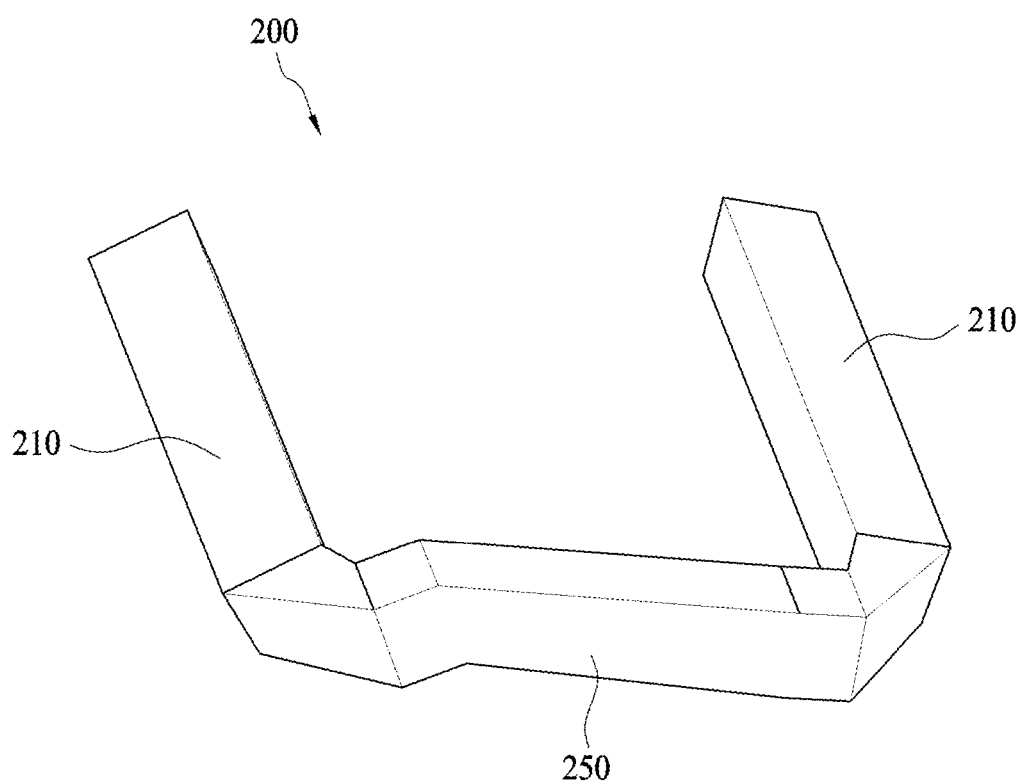

In addition, in FIGS. 13 to 15, various types of armature windings 200 manufactured by the present invention are illustrated.

In FIG. 13, a pair of intra-slot winding areas 210 and one end winding area 250 are included, and the pair of intra-slot winding areas 210 is inserted into different slots spaced apart from the stator, and is formed to be inserted into different phases. Accordingly, the end winding area 250 is bent to have various gradients to have an entirely inclined shape.

In the case of FIG. 14, an armature winding 200 comprising a plurality of intra-slot winding areas 210 and a plurality of end winding areas 250 is illustrated. For convenience of description, in the case of FIG. 14, a rear part of the armature winding 200 is omitted and only a front part thereof is illustrated.

The armature winding 200 illustrated in FIG. 14 has a form in which a plurality of layers are stacked, wherein the intra-slot winding areas 210 and the end winding area 250 of each layer are formed to be completely overlapped with each other in a vertical direction.

That is, in the present invention, it is possible to minimize a protruding length of the end winding area 250 exposed to the outside of the slot while the armature winding 200 having the plurality of layers is inserted into the slot.

In FIG. 15, like FIG. 13, a pair of intra-slot winding areas 210 and one end winding area 250 are included, and the pair of intra-slot winding areas 210 is inserted into different slots spaced apart from the stator, and may be formed to be inserted into different phases. Accordingly, the end winding area 250 is bent to have various gradients to have an entirely inclined shape.

However, the armature winding 200 illustrated in FIG. 15 is formed to have a greater length of the end winding area 250, and accordingly, a separation distance between the pair of intra-slot winding areas 210 is also formed farther.

Such a type of armature winding 200 is formed so that the pair of intra-slot winding areas 210 may be inserted into slots spaced apart from each other at a greater distance than that in FIG. 13, respectively.

As described above, after manufacturing the armature winding 200 through the steps (a) to (c), the manufacturing of the motor may be completed by performing a step (d) of inserting the intra-slot winding areas 210 of the distributed straight-angle armature winding 200 for each selected slot 112 of the stator 100 (see FIG. 1) in which the plurality of slots 112 (see FIG. 1) is formed in a circumferential direction, and a step (e) of connecting the intra-slot winding areas 210 of the different distributed straight-angle armature windings 200 inserted into the plurality of slots 112 to each other.

At this time, in the case of the step (e), the intra-slot winding areas 210 of the different distributed right-angle armature windings 200 may be connected to each other through various methods such as welding.

Figure 16:
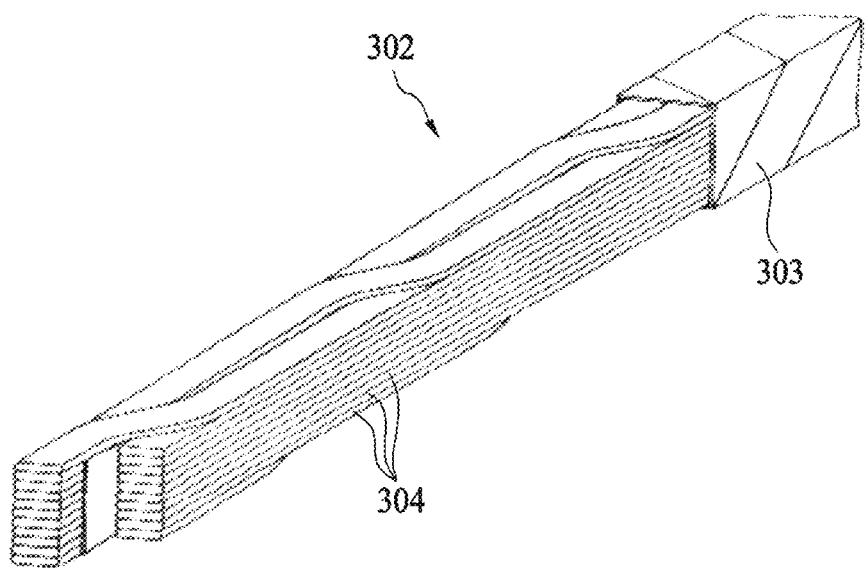
FIG. 16 is a diagram illustrating an appearance of a CTC cable which is applicable as a raw material in a method for manufacturing a motor comprising a distributed straight-angle armature winding according to an embodiment of the present invention.

Meanwhile, FIG. 16 is a diagram illustrating an appearance of a CTC cable which is applicable as a raw material in a method for manufacturing a motor comprising a distributed straight-angle armature winding according to an embodiment of the present invention.

In each process described above, it has been illustrated a straight-angle copper wire of copper or aluminum having a cross section formed in a rectangular shape, but a CTC cable 302 as illustrated in FIG. 16 may also be applied as the raw material of the distributed straight-angle armature winding of the present invention.

The CTC cable 302 includes a coating 303 which has a rectangular coil shape in which a plurality of rectangular cables 304 is twisted and covers a circumference of the coil. Such a CTC cable 302 is generally used in expensive generators and transformers.

Since each cable 304 is twisted while crossing each other, the CTC cable 302 has a result of reducing a skin effect and a proximity effect when rotating a device applied with a coil such as a motor or a generator at a high speed. Accordingly, when the CTC cable is used as a raw material to manufacture a winding or distributed type motor or generator in the form of a straight-angle coil, it is possible to maximize a space factor and extremely reduce an increase in resistance due to high rotation (high electrical frequency), thereby minimizing an efficiency difference according to a speed.

Figure 17:
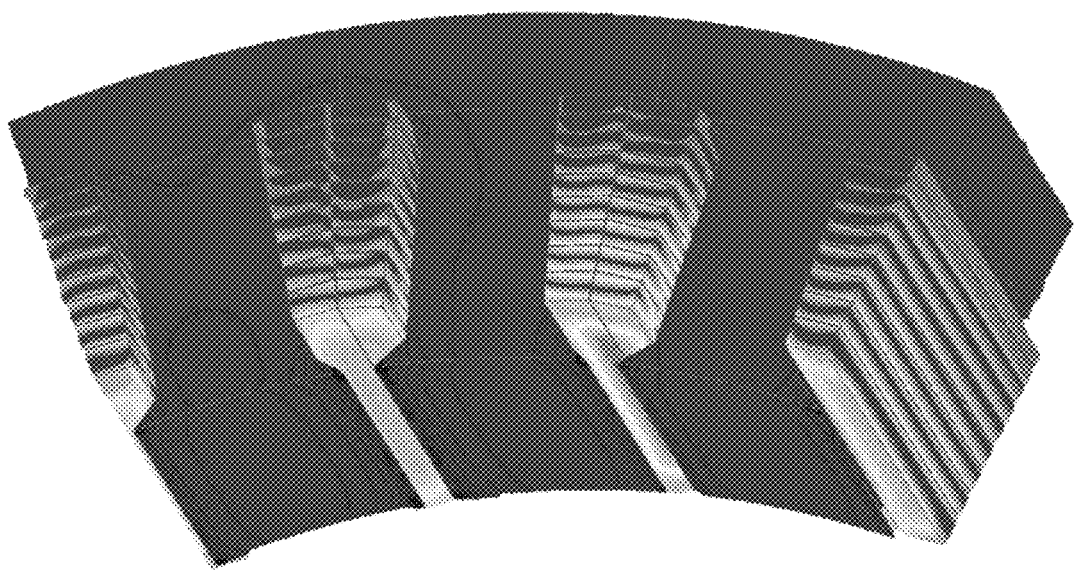
FIG. 17 is a diagram illustrating a conductor current density distribution form of a motor comprising a distributed straight-angle armature winding according to the present invention.

FIG. 17 is a diagram illustrating a conductor current density distribution form of a motor comprising a distributed right-angle armature winding according to the present invention.

As illustrated in FIG. 17, it can be confirmed that the current density of a conductor increases as approaching a core in the slot through 3D finite element analysis (FEA).

A current deflection phenomenon has a distribution illustrated in FIG. 17 under a specific electricity applying condition by the concentration of flux linkage generated in the center of the cross section of the conductor and the interaction of leakage flux generated in the core part due to the Ampere circuital law.

This phenomenon tends to become clearer as an operating frequency of the motor increases, and this phenomenon reduces an effective conductor cross-sectional area of the coil, resulting in an increase in AC resistance (AC Loss) of the coil according to an increase in frequency.

Figure 18:
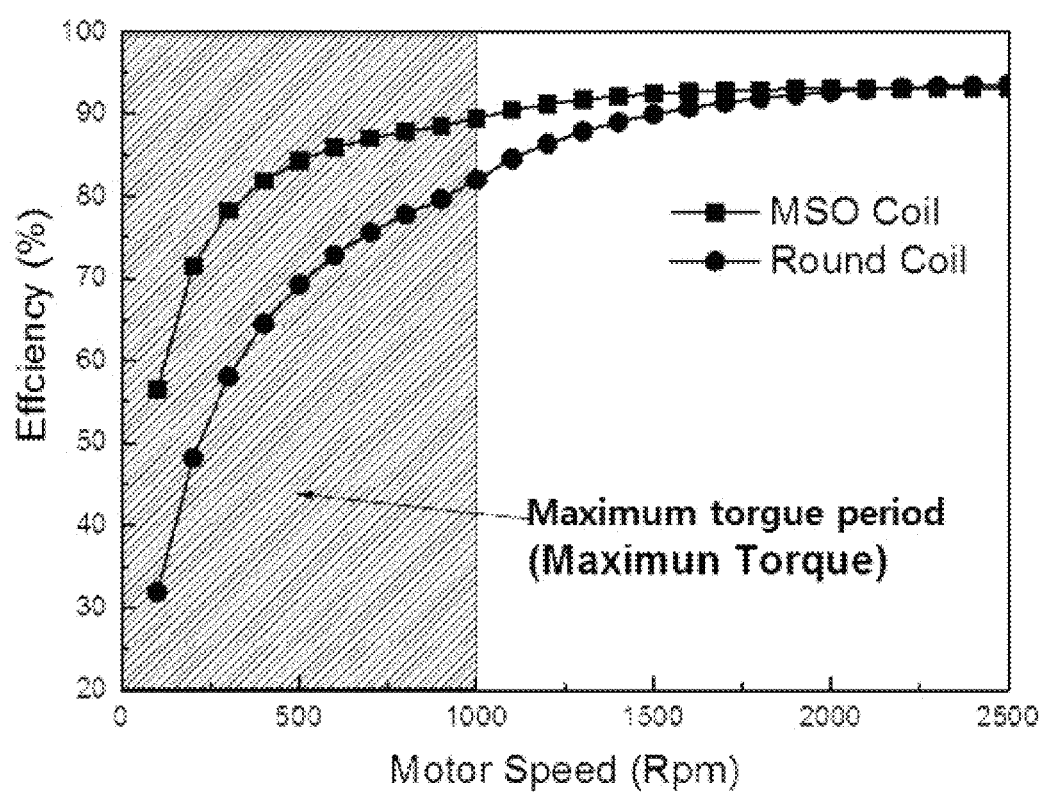
FIG. 18 is a graph for comparing the efficiencies of two motors having the same counter electromotive force, applying a winding shape as a variable in the motor specification for driving a 16-pole 24-slot in-wheel type electric vehicle.

FIG. 18 is a graph for comparing the efficiencies of two motors having the same counter electromotive force, applying a winding shape as a variable in the motor specification for driving a 16-pole 24-slot in-wheel type electric vehicle.

A space factor of a motor applied with an existing circular copper wire is 37.8%, and a space factor of a motor applied with a straight-angle armature winding is 82.8%. It can be seen that the motor applied with the straight-angle armature winding has improved efficiency of a maximum of about 25% at a low speed.

In addition, it can be seen that the efficiency is almost the same level from about 2,200 RPM by increasing the resistance due to the skin effect and the proximity effect described in FIG. 17.

Figure 19:
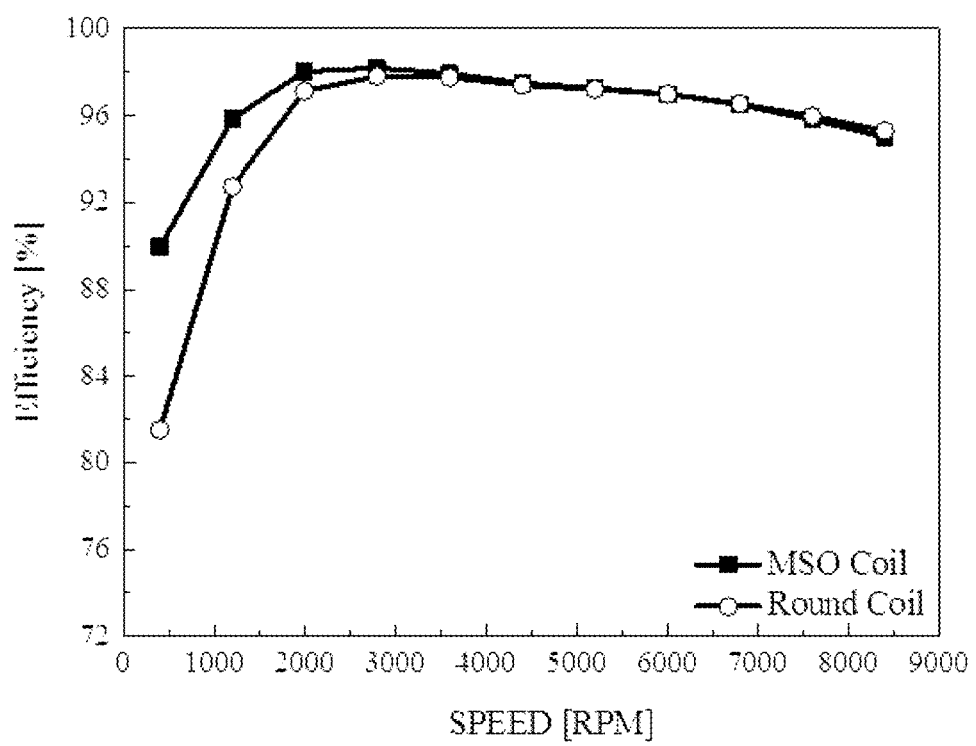
FIG. 19 is a graph for comparing the efficiencies by applying an annular copper wire and a straight-angle armature winding to an in-wheel motor of a 15 Kw-class electric vehicle of M company, a global component company, respectively.

FIG. 19 illustrates comparing the efficiencies by applying an annular copper wire and a straight-angle armature winding to an in-wheel motor of a 15 Kw-class electric vehicle of M company, a global component company, respectively.

At this time, it has been confirmed that the motor size and the counter electromotive force between comparison targets are the same, and the straight-angle armature winding technology improves the low-speed efficiency of a motor designed with maximum efficiency of 97% or more (3,000 RPM) by up to about 9%.

In addition, even at the maximum speed of about 9,000 RPM, the efficiency deterioration due to an increase in AC resistance of the straight-angle armature winding is about 0.8%, and the gain of improving the efficiency obtained at a low speed may be superior (low speed efficiency is effective for electric vehicles).

Figure 20:
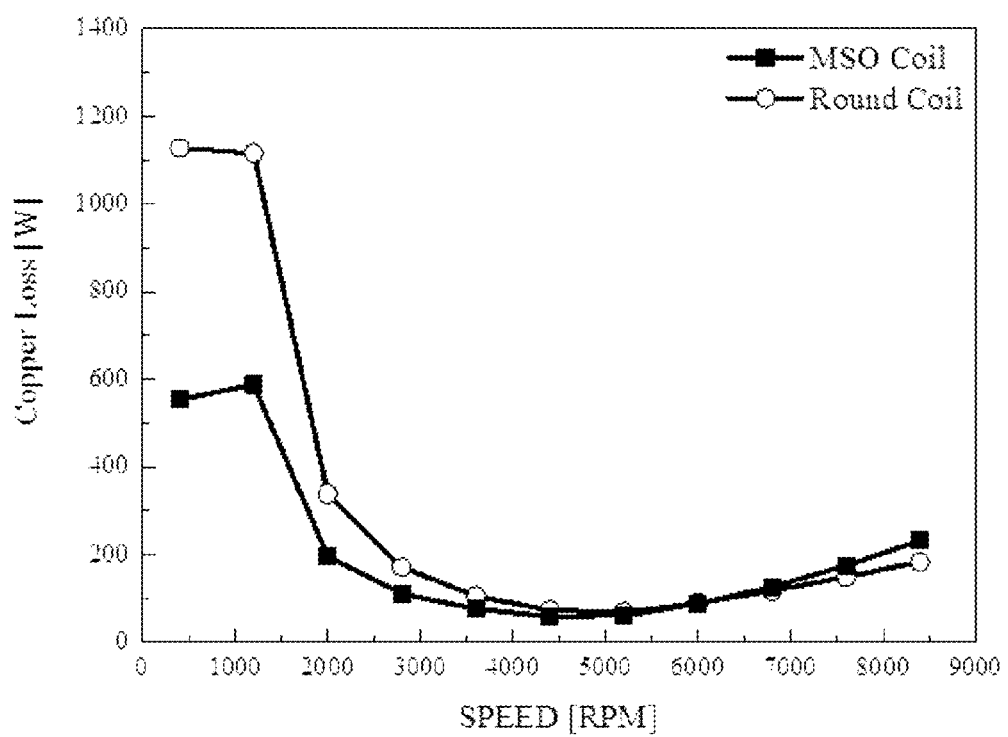
FIG. 20 is a graph showing pure AC resistance components of the straight-angle armature winding and the annular copper wire used for calculating the efficiency illustrated in FIG. 19.

FIG. 20 shows pure AC resistance components of the straight-angle armature winding and the annular copper wire used for calculating the efficiency illustrated in FIG. 19.

When the straight-angle armature winding is applied, it can be confirmed that an initial copper loss is a half level because a phase resistance is reduced by about 50% in the same motor size.

Thereafter, it can be seen that as the frequency increases due to the influence of the AC resistance, the loss of the motor applied to the straight-angle armature winding increases (a permanent magnet type motor is input with a large amount of current during initial driving, and the initial copper loss is basically large because an input current decreases as the speed increases).

Figure 21:
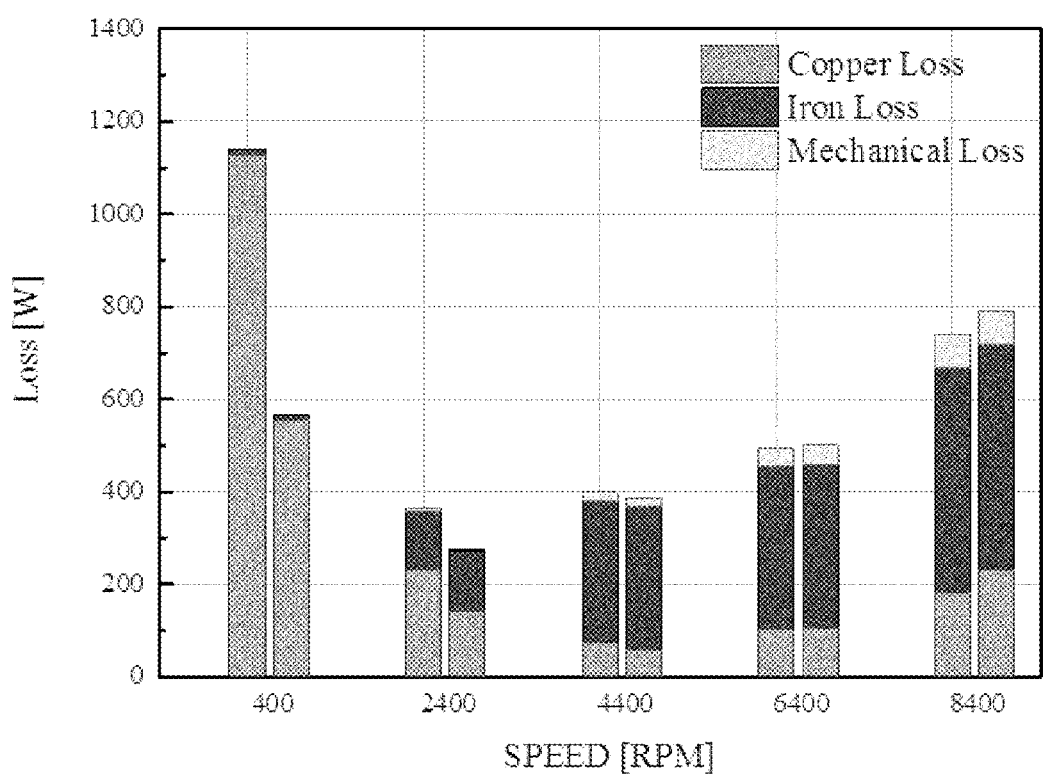
FIG. 21 is a graph for details of loss of operation speed (by frequency) of the motors illustrated in FIGS. 19 and 20.

FIG. 21 illustrates the description for details of loss of operation speed (by frequency) of the motors illustrated in FIGS. 19 and 20.

In the case of the permanent magnet type motor, the initial copper loss component is a main loss factor, and as the motor rotates at a high speed, the iron loss of a core portion is increased.

As a result, the straight-angle armature winding is a winding technology of extremely reducing most of the loss component, copper loss (AC Loss, AC resistance) during the initial acceleration (departure of the electric vehicle) of the permanent magnet type motor. In the loss component due to the increase in the AC resistance of the straight-angle armature winding according to an increase in frequency, it can be seen that the copper loss itself is lower than that at the low speed because the current input is decreased while the motor rotates at the high speed, and at the high speed, since the iron loss is the main loss component of the motor, the deterioration of the performance of the motor is very low due to the increase in the AC resistance of the straight-angle armature winding.

As described above, the prepared embodiments of the present invention have been described as above and a fact that the present invention can be materialized in other specific forms without departing from the gist or scope of the present invention in addition to the above described embodiments will be apparent to those skilled in the art. Therefore, the aforementioned embodiments are not limited but should be considered to be illustrative, and as a result, the present invention is not limited to the above description and may be modified within the scope of the appended claims and a range equivalent thereto.

EXPLANATION OF REFERENCE NUMERALS AND SYMBOLS

100: Motor
110: Stator
112: Slot
200: Armature winding
210: Intra-slot winding area
250: End winding area

The invention claimed is:

1. A method for manufacturing a distributed straight-angle armature winding comprising:
- a step (a) of preparing a raw material in which at least a pair of intra-slot winding areas and an end winding area provided between the pair of intra-slot winding areas are continuous;
- a step (b) of forming an inclined surface by processing a contact surface in contact with an inner surface of a slot of at least a stator of the circumferences of the pair of intra-slot winding areas; and
- a step (c) of bending a space between the end winding area and the intra-slot winding areas;
- wherein in the step (b), the intra-slot winding areas are pressed using a first press tool having a first press groove of which a lower portion is opened,
- wherein a plurality of first press tools is provided to have different standards to correspond to the intra-slot winding areas and the end winding area.

2. The method for manufacturing the distributed straight-angle armature winding of claim 1, wherein in the step (b), a surface outside the contact surface of the circumferences of the pair of intra-slot winding areas is further processed so that a height of the intra-slot winding areas are lower than a height of the end winding area.

3. The method for manufacturing the distributed straight-angle armature winding of claim 1, wherein in the step (b), the circumference of the intra-slot winding areas are processed using a rolling roller.

4. The method for manufacturing the distributed straight-angle armature winding of claim 1, wherein in the step (b), the intra-slot winding areas and the end winding area are simultaneously pressed using a second press tool in which the first press tools having different standards are integrally formed.

5. The method for manufacturing the distributed straight-angle armature winding of claim 1, wherein in the step (c), the raw material is positioned on a circumference of a bending base jig and the end winding area and the space between the end winding area and the intra-slot winding areas are bent by moving a bending roller along the circumference of the bending base jig.

6. The method for manufacturing the distributed straight-angle armature winding of claim 5, wherein in the step (c), the bending is performed while the raw material is pressed using a bending cover jig of pressing the raw material from the top of the bending base jig.

7. A method for manufacturing a motor comprising:
- a step (a) of preparing a raw material in which at least a pair of intra-slot winding areas and an end winding area provided between the pair of intra-slot winding areas are continuous;
- a step (b) of forming an inclined surface by processing a contact surface in contact with an inner surface of a slot of at least a stator of circumferences of the pair of intra-slot winding areas;
- a step (c) of manufacturing a distributed straight-angle armature winding by bending a space between the end winding area and the intra-slot winding areas;
- a step (d) of inserting the intra-slot winding areas of the distributed straight-angle armature winding into each selected slot of the stator in which a plurality of slots is formed in a circumference direction; and
- a step (e) of connecting the intra-slot winding areas of different distributed straight-angle armature windings inserted into the plurality of slots to each other,
- wherein in the step (b), the intra-slot winding areas is pressed using a first press tool having a first press groove of which a lower portion is opened,
- wherein a plurality of first press tools is provided to have different standards to correspond to the intra-slot winding areas and the end winding area.

8. The method for manufacturing the motor of claim 7, wherein an insulating coating having a high elongation rate is formed on the circumference of the raw material.

* * * * *